April 14, 1936.　　F. VON SCHÜTZ　　2,037,356
MULTIPLYING GEAR
Filed May 29, 1931　　2 Sheets-Sheet 1

Inventor:
F. Von Schutz
By: Glascock Downing & Seebold
Attys

April 14, 1936.  F. VON SCHÜTZ  2,037,356
MULTIPLYING GEAR
Filed May 29, 1931  2 Sheets-Sheet 2

F. Von Schutz
INVENTOR

By Marks & Clerk
ATTYS.

Patented Apr. 14, 1936

2,037,356

UNITED STATES PATENT OFFICE 2,037,356

MULTIPLYING GEAR

Friedrich von Schütz, Berlin, Germany, assignor to N. V. Machinerieen-en Apparaten Fabrieken "Meaf", Utrecht, Netherlands Application May 29, 1931, Serial No. 541,059
In Germany March 21, 1930

2 Claims. (Cl. 235—61)

The invention relates to an improvement of automatic integrating devices used for continuous measurings. Such apparatus as for instance planimeters with friction wheels show usually a small error of measuring, the absolute value of which is independent of the quantity of the value to be measured and remains the same over the whole range. This error therefore has a relatively little effect if the quantity of the value to be measured is high and a relatively big effect, if same is low. This feature is specially undesirable in cases where, when integrating mechanically or planimetering, results should be obtained which all have the same relative error, i. e. results showing the same degree of accuracy over the whole range.

Figure 1:
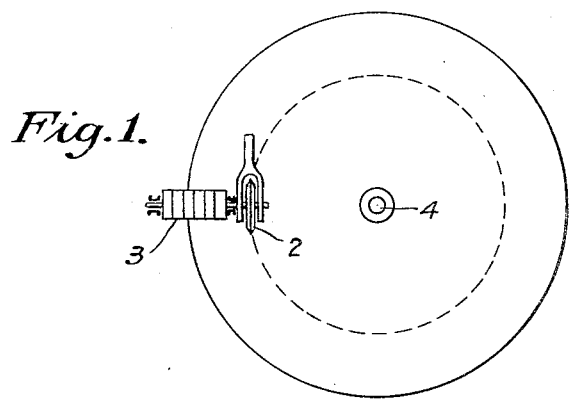
Fig. 1 shows an ordinary friction wheel drive for a register.

Fig. 1 shows an ordinary friction wheel gear. It consists of a rotating disk 1 which drives a friction wheel 2 which can be shifted on disk 1. To friction wheel 2 is connected a counting mechanism 3. The speed of the counting mechanism 3 equals the rotating velocity of disk 1, multiplied with a factor which depends on the position of friction wheel 2. The quantity counted by the counting mechanism in the unit of time increases proportionally to the distance between the friction wheel 2 and the centre 4 of the disk 1. Contrary to this, the error resulting from a difference between the real position of wheel 2 and the position it ought to have has a certain absolute value which is constant over the whole range. If the distance between the friction wheel 2 and the centre 4 is large, this error exercises a relatively little influence on the result, but if the distance is a little one, the influence is a relatively high one. That means that the relative inaccuracy of the apparatus is different at varying positions of the friction wheel 2.

The same is the case with friction wheel gears, in which the running surface of the friction wheel is not a disk but a surface of revolution generated by a circular arc and in which the friction wheel is mounted on a swinging arm and runs at right angles to the running surface on the latter.

According to this invention in friction wheel gears of the type referred to last a by far more constant value of the relative error of measuring over the whole range of the possible positions of the friction wheel is obtained by choosing as a generatrix for the surface of revolution an arc of a circle with which arcuate movements of the swinging arm carrying the friction wheel approximate the logarithms of the diameters of the respective parallel circles of the surface on which the friction wheel is running.

Figure 2:
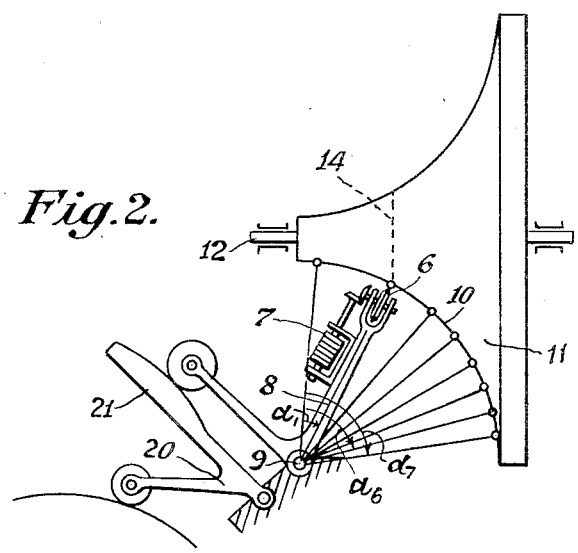
Fig. 2 is a diagrammatic representation of my invention.

Such an arrangement is shown in Fig. 2. The friction wheel 6 coupled with the counting mechanism 7 is mounted on the swinging arm 8 the axis 9 of which is vertical to the plane of drawing and goes through the centre of the meridian circle 10 of the running surface 11. The axis 12 of the latter lies in the plane of drawing. The friction wheel runs along the parallel circles 14 of the rotoid 11, which have larger or smaller diameters, according to the position of the swinging arm 8. The division of the meridian corresponds to a linear increasing of the diameters of the parallel circles and therefore also to a linear increasing of the result of counting. From the rays of the swinging arm corresponding to this division of the meridian there can be seen that the differences between the angular distances are large at the small parallel circles and small at the large ones.

The theoretically best arrangement in order to obtain an equal relative accuracy was to form the meridians of the running surface in such a manner that the angles $\alpha_1$, $\alpha_2$ of the positions of the swinging arm are proportional to the logarithms of the diameters of the corresponding parallel circles.

Figure 3:
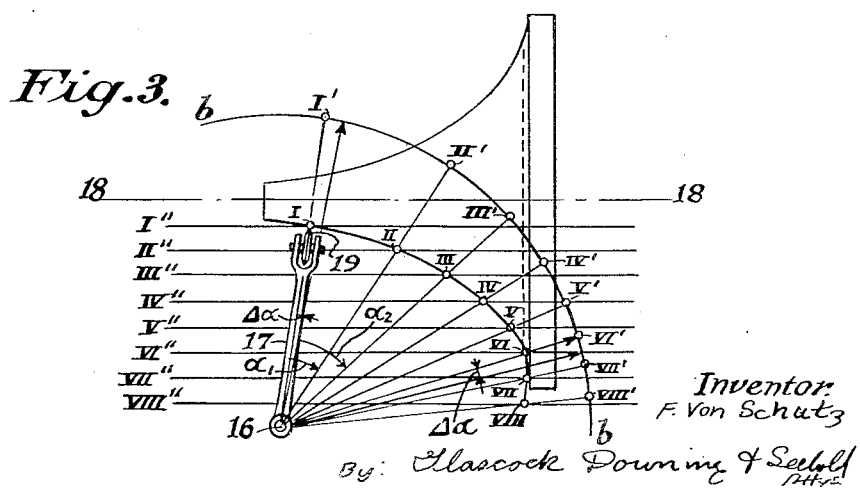
Fig. 3 is a diagram showing the relationship which exists between the arcuate movement of the friction wheel arm and the corresponding diameters of the driving surface therefor.

For better understanding, such an arrangement is shown in Fig. 3. The axis of the swinging arm 17 goes vertically to the plane of drawing through point 16. The circle $b$—$b$ round the point 16 has in the utilized range of the swinging arm a logarithmic scale I' to VIII'. The axis 18 of the running surface lies in the plane of drawing. Parallel to this axis there are drawn in equal distances the line I'', II'' . . . till VIII''. The intersection points I to VIII of these parallel lines with the rays from point 16 through the points I' to VIII' form the locus for the meridian line of the running surface, on which the friction wheel 19 is running. A divergence of the swinging arm of $\pm \Delta\alpha$ for instance would cause the friction wheel to run instead on the parallel circle I with a diameter of 10 mm. on a parallel circle with 11 mm. diameter, and would occasion an error of 10%. In consequence of the logarithmic scale the same angular divergence ≮Δα would cause the friction wheel to run instead of on the parallel circle VI with a diameter of 60 mm. on a parallel circle with 66 mm. diameter, which also would occasion an error of 10%. For: log 11—log 10=log 66—log 60=log 1.1. The relative error caused by the same angular divergence is in both cases the same, viz. 10%.

A running surface according to Fig. 3 however would be very difficult to be manufactured and would necessitate not only different lengths of the swinging arm 17, but also to have the friction wheel running not at a right angle to the running surface. However, with an arrangement according to this invention as shown in Fig. 2, it is not only possible to let the friction wheel always run at a right angle to the running surface and to have in all positions the same length of the swinging arm, but even the bearing of the swinging arm is easier to be made than that of the usual friction wheel gears where the axis of the friction wheel has to be displaced along a straight line. In the arrangement shown in Fig. 2, it will be noted that the logarithmic line shown in Fig. 3 has been replaced by an arc of a circle which closely approximates the said logarithmic line for the given range of swing of the wheel arm and still affords sufficient accuracy for all practical purposes.

Integrators for continuous counting according to this arrangement are especially useful in all cases where the swinging arm of the friction wheel is controlled by levers or organs, of which the variation of position is proportional to the logarithm of the factor, the influence of which they have to transmit. For then, owing to the parallelism of the characteristics of the movements of these levers and of the swinging arm, simple couplings, by means of levers or of curved disks with very uniform slope, will be sufficient, the shifting effect of which couplings is equally favorable over the whole range, to the benefit of the accuracy of the record.

Such levers with a movement according to a logarithmic characteristic are with special utility employed in multiplying gears, i. e. where several variable factors are to be multiplied with each other continuously. Integrating mechanisms according to this invention are therefore particularly suitable for combination with such multiplying gears i. e. they are very useful in all cases where out of several variable factors the product has to be formed continuously and where this product has to be integrated with the differential of another measured value, as for instance time or quantity.

An embodiment of this invention will now be described by way of example. This embodiment is designed for reducing automatically the registration of a volume gas meter for gases of variable condition to standard condition. The volume meters, for instance a drum gas meter, drives the running surface 11 of the friction wheel gear shown in Fig. 2. The swinging arm 8 of the friction wheel is controlled by a lever 20, the position of which is determined by the value of the momentary reduction factor $x$. This reduction factor can be formed as the product:

$$x=\frac{kp}{T}$$

where $p$ is the absolute pressure and T the absolute temperature of the gas, $k$ being a constant. Therefore the control of lever 20 can be effected by means of a known multiplying gear which forms the product of the factors $p$ and $$\frac{1}{T}$$

by logarithmic addition, using measuring instruments for absolute pressure and absolute temperature, the deflections of which are transmitted in a logarithmic scale, for instance by means of curved disk gears. Such multiplying gears depending on logarithmic addition are known; in the French Patent 652,813, for example, a gear is shown in which the average velocity of a car is determined by forming the product $$e \cdot \frac{1}{t}$$

$e$ being the covered way and $t$ the time required therefor.

The deflexions of lever 20, if the same is controlled in this way are proportional to the logarithms of the reduction factor $x$; the deflexions of the swinging arm 8 have to be according to this invention also proportional to the logarithms of the reduction factor $x$. Therefore the cam 21 that couples the two levers 20 and 8 is of simple shape and with uniform slope, so that no additional angular displacements of arm 8 are caused which would be different in the various positions of this arm 8. The counting mechanism therefore, provided that both the gas meter and the instruments for measuring pressure and temperature are operating right, gives over the whole range results with the same relative accuracy.

Figure 5:
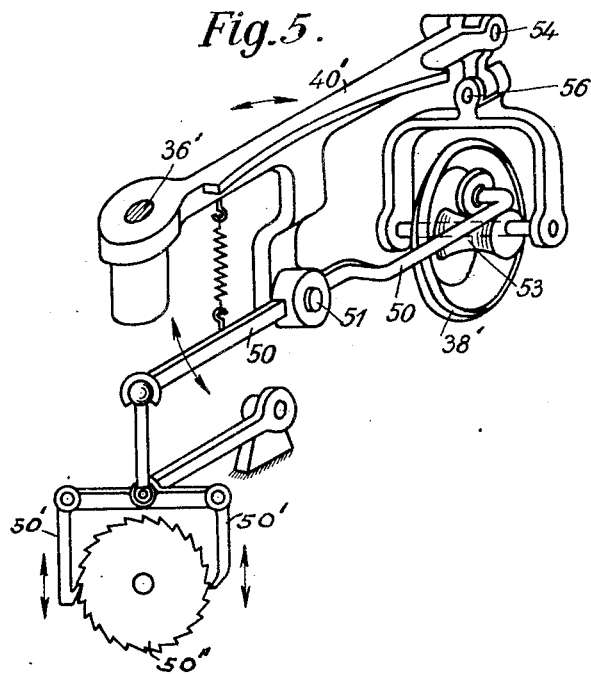
Fig. 5 is a perspective view of a modification of my friction wheel arm, with its register actuating means mounted thereon.
Figure 4:
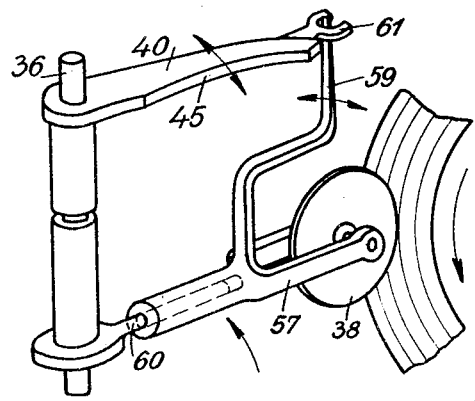
Fig. 4 is a perspective view of one form of my friction wheel arm.

In order to press the friction disk sufficiently against the running surface, a special arrangement, shown in Fig. 5, is used according to this invention. In this figure the counter actuating means has been omitted. The supporting fork 57 of the friction wheel 36 is capable of pivoting round a supporting arm 60, which is adapted to swing round an axle 36 corresponding to the axis 9 of the arrangement shown in Fig. 2. The cam 21 of lever 20 (Fig. 2) does not swing the supporting arm of the friction wheel itself, but a beam 59 (Fig. 4) mounted to the fork 57, for instance by means of a guide lever 40 which also pivots on axis 36. If this guide lever is displaced by means of lever 20 (Fig. 2) only very little force is necessary. The swinging of the friction wheel, which may be pressed against the running surface by means of a spring not shown in the drawings, into the parallel circle of the running surface which corresponds to the position of the guide lever 40 is then effected automatically and forces with great energy the fork 57 to follow. This force is not taken from lever 20 (Fig. 2) but from the running surface, i. e. from the gas meter by which the running surface is driven.

Figure 5 shows a modification in which the operation of the counting mechanism proceeding from the friction wheel 38' is preferably transmitted along the axis 36' of the guide lever 49', as shown in Fig. 5. In this manner any reaction of the work necessary for driving the counting mechanism, on the capability of swinging the arm 40' is avoided. The double lever 50 mounted to the guide lever at 51 is accorded an oscillatory motion by means of a cam or eccentric 53 connected to the friction wheel. At the point where the lever 50 intersects the axis 36' of the guide arm there is pivoted by means of a ball and socket joint or the like, a double ratchet 50' which is moved up and down, independently of the position of the guide arm and which advances a ratchet wheel 50'' coupled with the counting mechanism.

What is claimed is:

1. In an integrating mechanism, a friction wheel gear comprising a surface of revolution, the generatrix of which is an arc of a circle, an arcuately movable arm pivoted at the center of said circle and having a friction wheel at the free end thereof for engagement with different points on said surface, each arcuate movement of said arm causing the roller to engage the said surface at a point, at which the circumference of said surface has a length the logarithm of which is approximately proportional to the length of an arc as measured on the said generatrix through which the said arm must swing to reach the said point, and means to impart movement to said arm following a logarithmic law.

2. An integrating mechanism as claimed in claim 1 characterized by a lever mounted on said arm for oscillation thereon, an eccentric on the friction wheel adapted to oscillate said lever, an advancing mechanism, and means on said lever to actuate said advancing mechanism and located in line with the axis of arcuate movement of said arm.

FRIEDRICH von SCHÜTZ.